United States Patent [19]
Einberg

[11] 3,929,684
[45] Dec. 30, 1975

[54] NEW ADHESIVE TETRAZOLE POLYMERS AND PROCESS OF MAKING THEREFOR

[75] Inventor: Fred J. Einberg, Philadelphia, Pa.

[73] Assignee: The United States of America as represented by the Secretary of the Army, Washington, D.C.

[22] Filed: Jan. 21, 1974

[21] Appl. No.: 435,345

[52] U.S. Cl. .............................. 260/2 R; 260/308 D
[51] Int. Cl.² ........................................ C08G 73/06
[58] Field of Search .................................. 260/2 R

[56] References Cited
UNITED STATES PATENTS

| | | | |
|---|---|---|---|
| 3,386,968 | 6/1968 | Carpenter | 260/2 R |
| 3,468,874 | 9/1969 | Roap et al | 260/239.1 |

*Primary Examiner*—Wilbert J. Briggs, Sr.
*Attorney, Agent, or Firm*—Nathan Edelberg; Robert P. Gibson; Kalman Pollen

[57] ABSTRACT

New tetrazole polymers are formed from a self-polymerization condensation reaction effected by adding tetrazoles of the formula below to a solution containing an equivalent of base or slightly less than an equivalent and heating for about 5 days at temperatures of 50°–100°C:

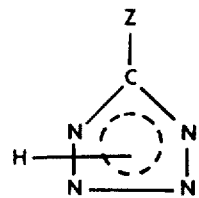

where Z is $CH_2CH_2X$ or $NHCOCH_2$, and where X is Br, Cl, or I. The polytetrazoles serve as binders in propellant systems and also supply added energy thereto.

8 Claims, No Drawings

NEW ADHESIVE TETRAZOLE POLYMERS AND PROCESS OF MAKING THEREFOR

The invention described herein may be manufactured, used and licensed by or for the Government for governmental purposes without the payment to me of any royalty thereon.

This invention relates to new compositions of matter and more particularly concerns new and improved tetrazole polymers for use in propellant systems.

An ideal binder for any propellant system must be capable of holding the propellant grains securely together; should impart a permanent shape to the propellant mass; and should desirably supply added energy to the propellant system. My tetrazole polymers substantially fulfill these criteria and, in addition, by depressing the temperature at which the propellant burns, reduce erosion of gun barrels in which the propellants are used.

It is an object of this invention to provide new and improved tetrazole polymers and novel polymerization techniques for forming them.

Another object of the invention is to provide such tetrazole polymers having enhanced adhesive properties.

Still another object of the invention is to provide tetrazole polymers having significant added energies when applied to propellant systems.

Other objects and advantages of the invention will become apparent as the invention is further described hereinafter.

The basic polymerization reaction which can be effected by polymerizing either N-5-tetrazolyl haloacetamide (Equation 1) or 5-(2-haloethyl) tetrazole (Equation 2) is diagrammed below:

significant amount of hydrolysis of the resulting polymer will occur. Several base-solvent combinations have been utilized for my polymerization reaction such as potassium hydroxide in methanol, aqueous sodium hydroxide, triethylamine in acetone and in dimethylformamide, and sodium hydride in dimethylformamide. It is preferred to use sodium hydride in dimethylformamide by which combination higher molecular weight polymers will be obtained. Higher molecular weight tetrazole polymers are desirable because superior tensile strengths will be obtained. Thus, such polymers when used as binders, supply a stronger matrix for the propellant system than would polymers of lower molecular weight. Sodium hydride in dimethylformamide furthers the formation of polymers of higher molecular weight because this combination has been found to effect less hydrolysis of the resulting polymer than do other base-solvent combinations. Moreover, the greater solubility in dimethylformamide of the resulting tetrazole polymers provides for the formation of polymers of greater molecular weight, since precipitation of the tetrazole polymer will stop polymerization. Reaction temperatures of 50°–100°C are suitable for effecting the polymerization, 70°–90°C being preferred. Heating of the reaction mixture should be carried out generally for a minimum of 5 days in order to effect optimum polymerization. However, when using aqueous sodium hydroxide, the reaction time is preferably only one day since sodium hydroxide will tend to hydrolyze the resultant polymer if the reaction is allowed to proceed longer. Suitable pH for the polymerization reaction is about 6 to 7. Below pH 6, there will be insufficient base to form the optimum amount of the salt of the tetrazole, the salt being a necessary intermediate in the formation of the polymer. At pH above 7,

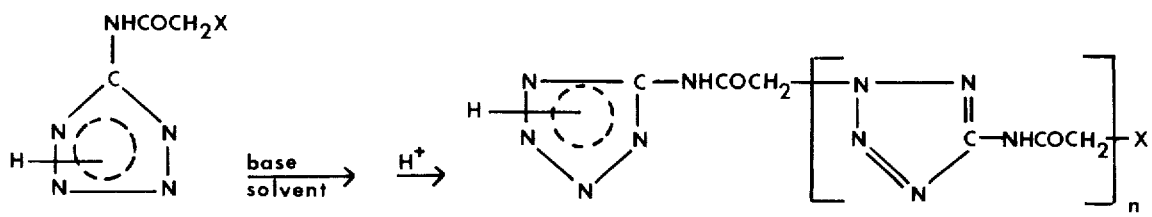

where X is Br, Cl or I; $n$ in an integer such that the inherent viscosity of the resulting polymers at 25°C is a number from about 0.05–0.11. Hydrolysis of the above polymer in aqueous NaOH produces 5-amino tetrazolyl-2-acetic acid which confirms the above structure.

excessive hydrolysis of the polymer will occur. As to the mechanism of my tetrazole polymerization, it is noteworthy that both N-5-tetrazolyl haloacetamide and 5-(2-haloethyl) tetrazole are bifunctional and undergo polymerization by an intermolecular substitution reac- Equation 2

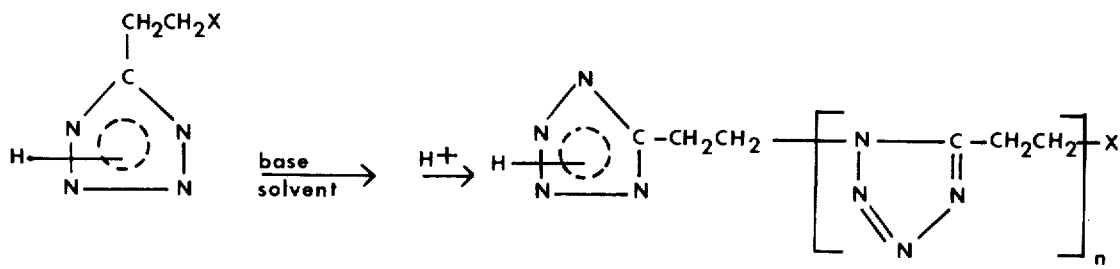

where X is Br, Cl, or I; $\eta$ is an integer such that the inherent viscosity of the polymer at 25°C is a number from about 0.03–0.36.

In the polymerization reaction, whether starting with N-5-tetrazolyl haloacetamide or 5-(2-haloethyl) tetrazole, certain reaction conditions should be observed. An equivalent of base or slightly less than an equivalent should be employed when effecting the polymerization reaction. If more than this amount of base is used, a tion (polycondensation) of the halo function with the tetrazolate anion.

The starting materials for my tetrazole polymers may be N-5-tetrazolyl haloacetamide or 5-(2-haloethyl) tetrazole, the latter being formed by reaction of β-halopropionitrile with aluminum azide in tetrahydrofuran solution at reaction temperatures of 127°C. This reaction and other reactions forming 5-(2-haloethyl) tetrazole are discussed in *J. Org. Chem.*, Vol 34, p. 1141, No. 4, April 1969. N-5-tetrazolyl haloacetamide however is now prepared for the first time by substituting a haloacetyl halide on the tetrazole ring. Prior art would seem to suggest the use of such bases as pyridene or trimethylamine in a process for substituting an α-halocarbonyl on the tetrazole ring. However, when pyridene or trimethylamine were tried with my starting materials, the bases proved quite unsatisfactory producing poor yields of the desired tetrazole which was quite difficult to isolate. We have now discovered that dimethylformamide serves excellently in the facile acylation of 5-aminotetrazole by a haloacetyl halide. A product is obtained in high yield, which is easy to isolate.

The resulting tetrazole polymers formed in accordance with this invention have large percentages of nitrogen, undergo rapid decomposition in a flame, are useful as fuels and binders for composite propellants and explosives and as a coating for "caseless" ammunition rounds. The invention may be better understood by reference to the following examples:

EXAMPLE I

Reagent-grade N,N-dimethylformamide was distilled at reduced pressure over a calcium hydride through a Vigreaux Claisen adapter. Anhydrous 5-aminotetrazole was prepared from the monohydrate by drying several hours in an oven at 100°C and then under vacuum pump pressure at 100°C overnight.

Preparation of N-5-tetrazolyl chloroacetamide: To a stirred solution of anhydrous 5-aminotetrazole, 85.0 g., 1.0 mole, in 400 ml of dimethylformamide, chloroacetyl chloride, 113 g., 1.0 mole, was added from a dropping funnel during about 25 minutes. The temperature of the mixture rose to a maximum of 85°C and was kept at approximately 80°C for 1 hr. longer by heating the mixture. The mixture was evaporated to approximately one-half the volume, poured into 1500 ml of water and cooled several hrs. in a refrigerator. The precipitated solid was collected on a filter and washed with cold water. The solid was dried at 50°–60°C to give 100.2 g., m.p. 218°C dec., 62% crude yield. Treatment of the solid with decolorizing carbon and crystallization from alcohol gave a white, fluffy, crystalline solid, m.p. 227°–228°C dec.

Anal. Calcd. for $C_3H_4ClN_5O$: C, 22.29; H, 2,48; N, 43.34; Cl, 21.98.

Found: C, 22.53; H, 2.34; N, 43.45; Cl, 21.81.

EXAMPLE II

The polymerization of N-5-tetrazolyl chloroacetamide:

N-5-tetrazolyl chloroacetamide, 4 grams, 0.025 mole was added to potassium hydroxide 1.4 g., 0.025 mole dissolved in 40 ml of methyl alcohol. The mixture was stirred with a magnetic stirrer under reflux for 5 days. The methyl alcohol was then evaporated using a rotary evaporator, the solids dissolved in water, and the solution was made strongly acidic by adding concentrated hydrochloric acid. The clear, colorless polymer was collected and dried under vacuum at 70°–80°C, yield 1.4 grams. The polymer darkened above 240°C and decomposed above 250°C without melting. The IR spectrum was consistent for a tetrazole polyamide. 25°C $\eta_{inh}$ = 0.05 (0.5% in dimethylformamide) (hereinafter referred to as DMF)

Anal: Found: C, 27.40; H, 2.97; N, 49.13

EXAMPLE III

N-5-tetrazolyl chloroacetamide, 8.0 g., 0.05 mole, was dissolved in 100 ml of dimethylformamide and triethylamine, 5.0 g., 0.05 mole was added. The mixture was heated at 75°–85°C for 5 days with stirring. The cooled mixture was filtered using a Buchner funnel, and 5.3 g., 77.9% of theoretical, of triethylamine hydrochloride was collected. The trimethylformamide was evaporated to a small volume using a rotary evaporator and the solution was poured into methylene chloride. The flocculent, white precipitate was filtered, washed with methylene chloride and dried in an oven at 100°C to give 6.6 g. of an amber, hard, brittle resin at room temperature, and decomposed above 190°C. A small portion was dried overnight in an Abderhalden Apparatus under vacuum at 78°C for analysis and inherent viscosity measurements. 25°C $\eta_{inh}$ = 0.07, 0.5% in DMF.

Anal: Found: C, 30.06; H, 4.68; N, 45.43; Cl, 3.39.

EXAMPLE IV

N-5-tetrazolyl chloroacetamide, 8.0 g., 0.05 mole was dissolved in 100 ml of dimethylformamide and sodium hydride, 2.5 g., 53% in oil, 0.05 mole, was added. The mixture was heated at approximately 90°C for 6 days. The sodium chloride precipitate was filtered (5.1 g.) and discarded. The filtrate was poured into 400 ml of methylene chloride and the polymer precipitate (5.6 g.) was collected and dried at 100°C. The hard, brittle solid was ground to a fine powder and treated with 20% hydrochloric acid, and washed with water. A portion was dried in an Abderhalden Apparatus at 80°C under vacuum pump pressure for inherent viscosity measurements and elemental analysis. The polymer intumesced and turned black at 245°–265°C. 25°C $\eta_{inh}$ = 0.11 (0.5% in DMF)

Anal: Found: C, 28.27; H, 3.20; N, 50.24; Cl, 0.00.

EXAMPLE V

N-5-tetrazolyl chloroacetamide, 8.0 g., 0.05 mole, and 2.0 g., 0.05 mole of sodium hydroxide was dissolved in 100 ml of water (aqueous NaOH added to N-5-tetrazolyl chloroacetamide) and was refluxed for 24 hrs. The precipitated polymer, fraction 1, 1.3 g., was treated with dilute HCl, washed with water and dried. The polymer was a hard, tough, opaque white solid which decomposed without melting above 240°C. The filtrate was then made very acidic with HCl and evaporated to dryness using a rotary evaporator. The solid was extracted with alcohol and the alcohol evaporated to give 0.9 g. of hard, transparent polymer, the second fraction. The residual solid, insoluble in alcohol, was dissolved in a minimum amount of DMF and precipitated by pouring into methylene chloride. The precipitated polymer was washed with methylene chloride and dried, fraction 3, 0.7 g. of a hard, transparent solid.

Anal: (fraction 1) Found: C, 26.65; H, 3.12; N, 48.58; Cl, 4.48

EXAMPLE VI

Polymerization of 5-(2-chloroethyl) tetrazole:

5-(2-chloroethyl) tetrazole, 6.6 g., 0.05 mole, was added to potassium hydroxide, 2.8 g., 0.05 mole, in 50 ml of methyl alcohol. The mixture was stirred with a magnetic stirrer under reflux for 5 days. The mixture was cooled and the precipitated potassium chloride, 1.7 g., 45.9% of theoretical, was collected on a filter. The filtrate was evaporated to dryness and the solid dissolved in water and then made acid, pH<2, with concentrated HCl. A sticky, taffy-like material slowly precipitated. The precipitated polymer was collected by decanting the liquid, and then washed with water and dried. The dried polymer, 2.0 g., was hard at room temperature and soft at 100°C. The combined decanted water and wash water was evaporated. The residue was extracted with acetone. The acetone solution was evaporated to dryness leaving 2.1 g. of a viscous, taffy-like polymer at room temperature. The water insoluble polymer gave the following inherent viscosity at 25°C and elemental analysis: 25°C $\eta_{inh}$ = 0.03 ( 0.5% in DMF)

Anal: Found: C, 33.63; H, 3.90; N, 53.01; Cl, 5.89.

EXAMPLE VII 5-(2-chloroethyl) tetrazole, 6.6 g., 0.05 mole, was dissolved in 50 ml of DMF. To the solution was added 2.6 g., 0.05 mole, of NaH (53% in oil). The solution became hot. It was left standing over the week-end and then heated at 95°C for 4 days. The NaCl precipitate was collected on a filter and washed with ethyl alcohol. The dry weight of salt was 3.3 g., 89.2% of the theoretical amount. The DMF was removed from the filtrate and the remaining solid was dissolved in water. The solution was made strongly acidic with concentrated HCl and allowed to stand overnight. The viscous, gummy material which settled out was separated by decanting and washing with water. The dry material weighed 3.2 g. It was extracted with acetone to give 0.7 g. of acetone soluble polymer and the remainder, 2.5 g., of acetone insoluble polymer was soluble in DMF. Water soluble polymer, 0.9 g., was recovered from the strongly acid water filtrate by evaporating the water, dissolving in acetone, and separating the salt by filtration. The acetone was evaporated and the polymer was dried. The polymer fraction which was soluble in DMF but insoluble in water and acetone, gave the following inherent viscosity at 25°C and elemental analysis: 25°C $\eta_{inh}$ = 0.36 (0.5% in DMF)

Anal: Found: C, 35.09; H, 3.99; N, 54.47; Cl, 1.18

I claim:

1. Tetrazole polymers of the formula

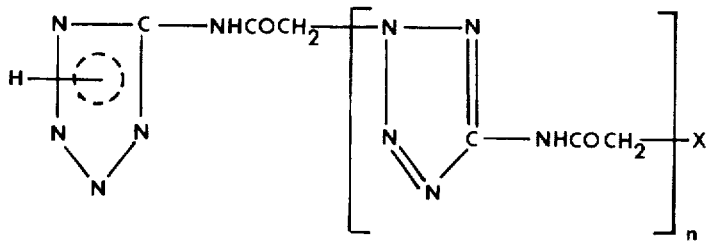

where X is a member selected from the group consisting of Br, Cl, and I, and $\eta$ is an integer such that the inherent viscosity of said tetrazole polymers at 25°C is a number from about 0.05–0.11.

2. Tetrazole polymers according to claim 1 where X is Cl.

3. Process for forming tetrazole polymers comprising adding substances of the formula

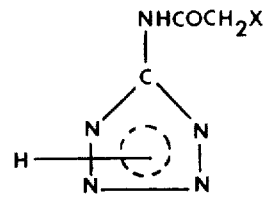

where X is a member selected from the group consisting of Br, Cl, and I to a medium where base is present therein in a molar equivalent amount to said N-5-tetrazolyl haloacetamide or slightly less than a molar equivalent amount and then heating said medium at 50°–100°C for a minimum of 5 days.

4. Process according to claim 3 where X is Cl.

5. Process according to claim 3 where the reaction medium is formed of sodium hydride of dimethylformamide.

6. Process according to claim 4 where the reaction medium is formed of potassium hydroxide in methyl alcohol.

7. Process according to claim 4 where the reaction medium is formed of triethylamine in dimethylformamide.

8. Process according to claim 4 where the reaction medium is formed of sodium hydroxide in water.

* * * * *